US012015641B1

(12) United States Patent
Horesh

(10) Patent No.: US 12,015,641 B1
(45) Date of Patent: *Jun. 18, 2024

(54) MALICIOUS MESSAGE CLASSIFICATION USING MACHINE LEARNING MODELS

(71) Applicant: INTUIT INC., Mountain View, CA (US)

(72) Inventor: Yair Horesh, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,270

(22) Filed: Jul. 18, 2023

Related U.S. Application Data

(63) Continuation of application No. 18/160,211, filed on Jan. 26, 2023, now Pat. No. 11,750,650.

(51) Int. Cl.
H04L 9/40 (2022.01)
G06F 40/40 (2020.01)

(52) U.S. Cl.
CPC .......... H04L 63/1483 (2013.01); G06F 40/40 (2020.01); H04L 63/1425 (2013.01)

(58) Field of Classification Search
CPC .................................................. H04L 63/1483
See application file for complete search history.

(56) References Cited

U.S. PATENT DOCUMENTS

| 9,781,149 | B1 | 10/2017 | Himler | |
|---|---|---|---|---|
| 9,912,687 | B1 | 3/2018 | Wescoe | |
| 10,834,111 | B2 * | 11/2020 | Adir | H04L 63/1483 |
| 10,924,514 | B1 | 2/2021 | Altman | |
| 11,361,100 | B1 | 6/2022 | Gates | |
| 11,616,799 | B1 * | 3/2023 | Canzanese, Jr. | H04L 63/102 726/23 |
| 2019/0042748 | A1 * | 2/2019 | Shabtai | G06N 20/00 |
| 2019/0392333 | A1 | 12/2019 | Vega | |
| 2020/0118137 | A1 | 4/2020 | Sood | |
| 2020/0363920 | A1 | 11/2020 | Ignatyev | |
| 2020/0396248 | A1 * | 12/2020 | Lee | H04L 63/1425 |
| 2021/0233123 | A1 | 7/2021 | Way | |
| 2021/0400076 | A1 * | 12/2021 | Shivanna | G06N 5/022 |
| 2022/0092087 | A1 | 3/2022 | Raghuramu | |
| 2022/0094713 | A1 | 3/2022 | Lee | |
| 2022/0124117 | A1 | 4/2022 | Bilugu | |
| 2022/0188411 | A1 | 6/2022 | Lee | |
| 2022/0224724 | A1 | 7/2022 | Bazalgette | |
| 2022/0255950 | A1 * | 8/2022 | Dedenok | H04L 51/08 |
| 2022/0263846 | A1 | 8/2022 | Armelin | |
| 2022/0345485 | A1 | 10/2022 | Kras | |
| 2022/0400133 | A1 | 12/2022 | Huang | |

(Continued)

Primary Examiner — Khang Do

(74) Attorney, Agent, or Firm — DLA Piper LLP (US)

(57) ABSTRACT

Knowledge about a user is used to determine whether one or more messages received by the user are malicious. The knowledge about the user may be based on the user's financial history such as transaction records. Particularly, a classifier model is trained on a supervised approach using a dataset containing, for example, a categorization of incoming messages (e.g., password change message), the user's aggregated transaction records, message attributes, user attributes, and corresponding classification labels. After the training, the classifier model is deployed to determine whether an incoming message is malicious.

20 Claims, 4 Drawing Sheets

(56) References Cited

U.S. PATENT DOCUMENTS

| | | |
|---|---|---|
| 2023/0007023 A1 | 1/2023 | Andrabi |
| 2023/0031874 A1 | 2/2023 | Goldfield |
| 2023/0042210 A1 | 2/2023 | Yee |
| 2023/0089920 A1* | 3/2023 | Post .................... H04L 63/1416 726/5 |
| 2023/0171287 A1* | 6/2023 | Slobodyanuk ........ H04L 51/212 726/23 |
| 2023/0316151 A1* | 10/2023 | Tian ........................ G06N 5/01 706/12 |

* cited by examiner

MALICIOUS MESSAGE CLASSIFICATION USING MACHINE LEARNING MODELS

CROSS REFERENCE TO RELATED APPLICATIONS

This application is a continuation of U.S. application Ser. No. 18/160,211, filed Jan. 26, 2023. The entirety of the above-listed application is incorporated herein by reference.

BACKGROUND

With increased connectivity in the world, electronic device users are constantly bombarded by a multitude of messages. Such messages may be in the form of e-mails, text messages (also known as short messaging service, SMS), chat messages, and or any other type of message through any kind of platform. In some cases, the messages are innocuous: they may be from friends and family members for check-ins, from companies with advertisements and notifications, and from organizations with solicitations. But other messages are malicious: nefarious entities may ask for personal information or bank information, may redirect the user to a malicious website, and or cause the user to be defrauded in some other way. An example malicious message may be along the lines of "PayPal/QuickBooks/AMEX Support: we detected an abnormal activity in your account. Please change your password immediately. To change your password, click <link>." The <link> is illegitimate and generally designed to steal personal and or account information from the user. It is therefore desirable that malicious messages such as the one above be identified, and the intended recipient be made aware the messages are malicious.

Conventional malicious message identification tools are not as effective as desired. These tools generally use rules, e.g., some tools use the source information such as origin IP address, to determine whether a message is malicious. Typically, the messages themselves are analyzed to detect whether they are malicious. As nefarious actors grow in sophistication, these rules can be easily detected and circumvented. For example, in the context of e-mails, no matter how strong spam filters are, spamming messages continue to get through to the user.

To mitigate these shortcomings, some institutions offer online human expert services. For example, a user can call an expert in the institution to inquire about the message he or she received. This manual approach, however, has several shortcomings. The expert services are generally not staffed adequately, and it may take some time for a user to reach an expert. It is well-known that malicious messages generally have a sense of urgency for the user to act quickly and the user may be defrauded because of the delay in getting through to an expert. Furthermore, using human experts is cumbersome and inefficient.

As such, a significant improvement in malicious message identification is therefore desired.

SUMMARY

Embodiments disclosed herein solve the aforementioned technical problems and may provide other technical solutions as well. Contrary to conventional techniques that analyze just the incoming message itself, one or more embodiments disclosed herein further leverage knowledge about a user to determine whether one or more messages received by the user are malicious. The knowledge about the user may be based on the user's financial history such as e.g., transaction records. Particularly, a classifier model is trained on a supervised approach using a dataset containing, for example, a categorization of incoming messages (e.g., password change message), the user's aggregated transaction records, message attributes, user attributes, and corresponding classification labels. After the training, the classifier model is deployed to determine whether an incoming message is malicious.

In an embodiment, a processor implemented method is provided. The method may comprise classifying, using a natural language processing model, a plurality of messages into a plurality of categories, each category associated with a confidence score. The method may also comprise aggregating transactions histories for a plurality of users that received the plurality of messages. The method may further comprise training, using a supervised approach, a classifier model on a dataset comprising corresponding confidence scores for the plurality of categories, vendor attributes in the aggregated transaction history, and message attributes of the plurality of messages, such that the classifier model is configured to be deployed to determine whether a message is malicious. The method may additionally comprise receiving a first message from the user and deploying the classifier model to determine whether the first message is a malicious message.

In another embodiment, a system is provided. The system may comprise a non-transitory storage medium storing computer program instructions and one or more processors configured to execute the computer program instructions to cause operations. The operations may comprise classifying, using a natural language processing model, a plurality of messages into a plurality of categories, each category associated with a confidence score. The operations may also comprise aggregating transactions histories for a plurality of users that received the plurality of messages. The operations may further comprise training, using a supervised approach, a classifier model on a dataset comprising corresponding confidence scores for the plurality of categories, vendor attributes in the aggregated transaction history, and message attributes of the plurality of messages, such that the classifier model is configured to be deployed to determine whether a message is malicious. The operations may additionally comprise receiving a first message from the user and deploying the classifier model to determine whether the first message is a malicious message.

DETAILED DESCRIPTION OF SEVERAL EMBODIMENTS

To mitigate the above deficiencies, embodiments disclosed herein leverage knowledge about its users to identify malicious messages. Particularly, a classifier model is trained using a dataset comprising, for example, a categorization of messages and the corresponding confidence scores and the transaction history of the users. The transaction history may provide vendor attributes and user attributes. Such training based on a more comprehensive dataset—particularly leveraging knowledge about several users—may generate a more robust classifier model compared to conventionally generated classifiers. The trained classifier model may then receive an incoming message from the user, determine whether the incoming message is malicious, and provide a corresponding notification and or alert to the user.

Figure 1:
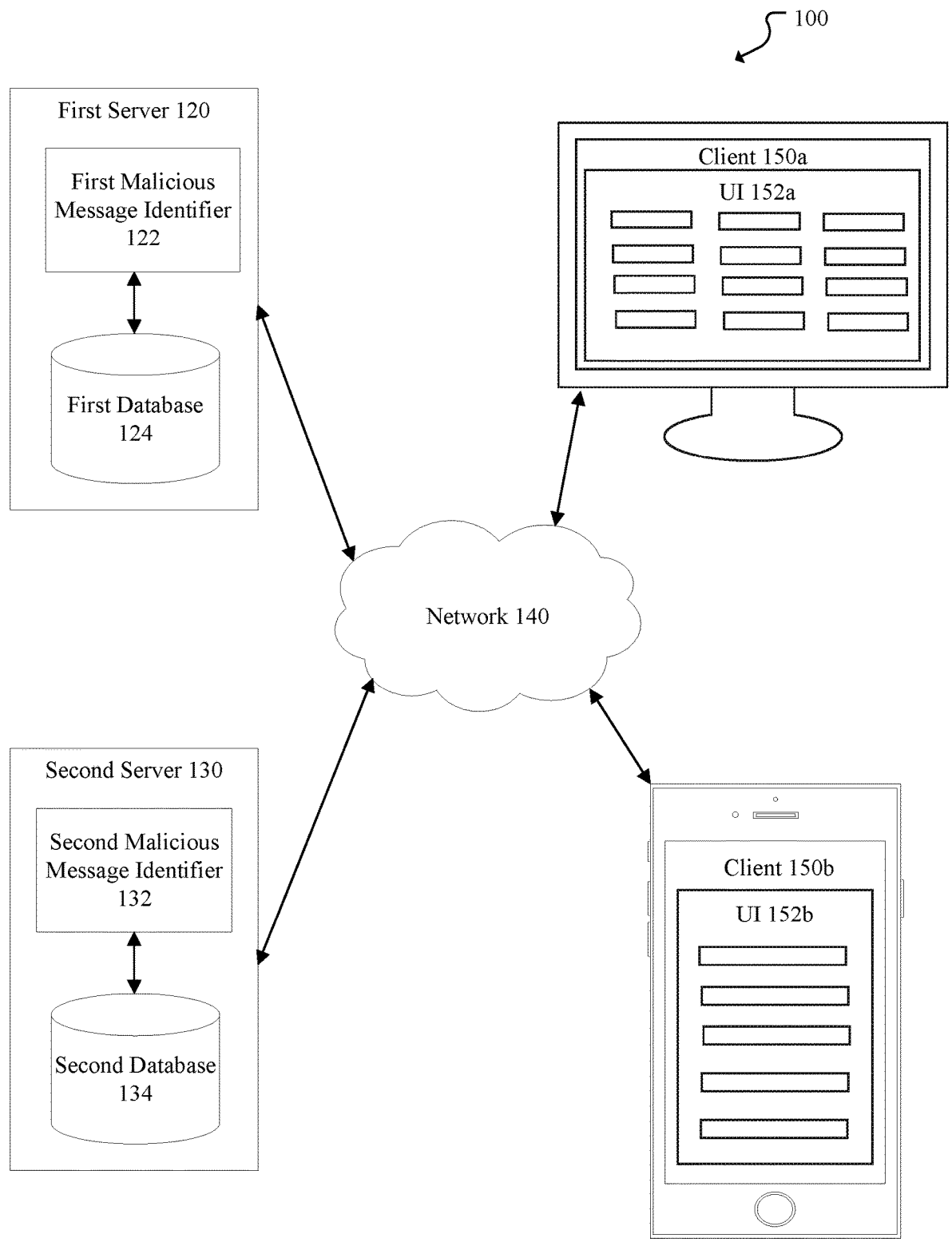
FIG. 1 shows an example of a system configured for identifying malicious messages, based on the principles disclosed herein.

FIG. 1 shows an example of a system 100 configured for identifying malicious messages, based on the principles disclosed herein. It should be understood that the components of the system 100 shown in FIG. 1 and described herein are merely examples and systems with additional, alternative, or fewer number of components should be considered within the scope of this disclosure.

As shown, the system 100 comprises client devices 150a, 150b (collectively referred to herein as "client devices 150") and servers 120, 130 interconnected through a network 140. The first server 120 hosts a first malicious message identifier 122 and a first database 124 and the second server 130 hosts a second malicious message identifier 132 and a second database 134. The client devices 150a, 150b have user interfaces 152a, 152b, respectively (collectively referred to herein as "user interfaces (UIs) 152"), which may be used to communicate with the malicious message identifiers 122, 132 using the network 140. For example, communication between the different components of the system 100 is facilitated by one or more application programming interfaces (APIs). APIs of system 100 may be proprietary and or may include such APIs as Amazon® Web Services (AWS) APIs or the like. The network 140 may be the Internet and or other public or private networks or combinations thereof. The network 140 therefore should be understood to include any type of circuit switching network, packet switching network, or a combination thereof. Non-limiting examples of the network 140 may include a local area network (LAN), metropolitan area network (MAN), wide area network (WAN), and the like.

Client devices 150 may include any device configured to present the user interfaces (UIs) 152 and receive user inputs. The client devices 150 may generally be used by the users to forward messages to the message identifiers 122, 132, which in turn determine whether the received messages is malicious and transmit corresponding notifications and or alters to the UIs 152. In one or more embodiments, the forwarded messages may be in the form of screenshots, in which case one or more components of the system 100 may perform an optical character recognition (OCR) to extract the text from the screenshots.

In one or more embodiments, the client devices 150 may be used by administrative users or specialized users to train and or deploy the malicious message identifiers. The training may include retrieving user transaction data from different sources (e.g., financial institutions) and a plurality of messages received by the users, and using the retrieved data to train the message identifiers 122, 132. Once trained, an administrative user may provide an indication through the corresponding client devices 150 the malicious message identifiers 122, 132 are ready to be deployed.

First server 120, second server 130, first database 124, second database 134, and client devices 150 are each depicted as single devices for ease of illustration, but those of ordinary skill in the art will appreciate that first server 120, second server 130, first database 124, second database 134, and or client devices 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one or two) servers. In another example, a plurality of client devices 150 may communicate with first server 120 and/or second server 130. A single user may have multiple client devices 150, and/or there may be multiple users each having their own client devices 150.

Figure 2:
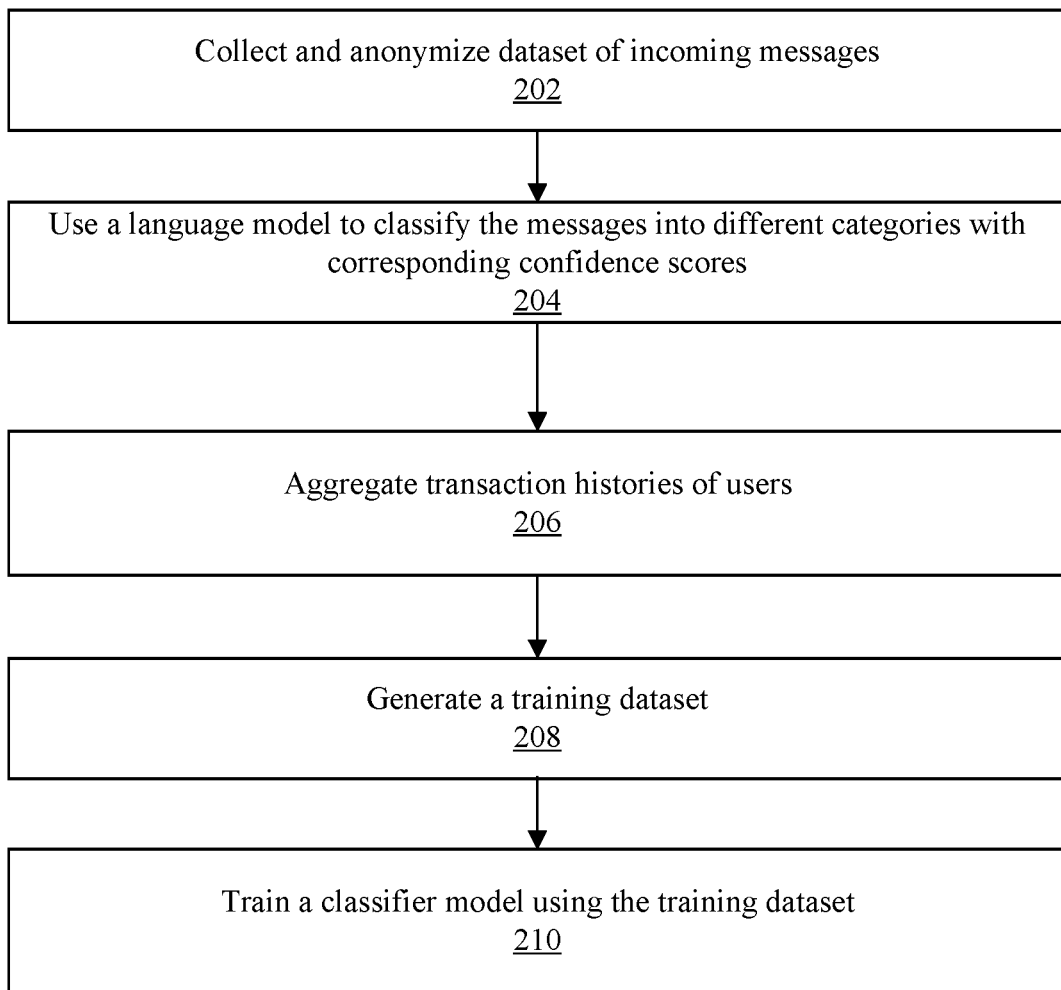
FIG. 2 shows an example method of training a classifier model for determining whether an incoming message is malicious, based on the principles disclosed herein.

FIG. 2 shows an example method 200 of training a classifier model for determining whether an incoming message is malicious, based on the principles disclosed herein. One or more steps of the method 200 may be performed by one or more components of the system 100 shown in FIG. 1. It should be understood that the shown steps are merely exemplary and should not be considered limiting. Furthermore, the sequence of the steps is exemplary, and the illustrated sequence should not be considered limiting. Therefore, methods with additional, alternative, fewer, or differently sequenced steps should also be considered within the scope of this disclosure.

The method 200 starts at step 202, where a dataset of incoming messages is collected and anonymized. The incoming messages may include malicious messages, non-malicious messages, and or attempted malicious messages. These messages can be collected from any source or database. For example, users may provide a list of messages they have received. In one or more embodiments, the messages may be provided as screenshots. In other examples, one or more components of the system 100 may operate as a gatekeeper (based on the users' permissions) to collect the messages. The messages may comprise incoming messages through any technology including but not limited to, e-mail messages, text messages (also known as SMS messages), multimedia messaging service (MMS) messages, chat messages (e.g., through Facebook® Messenger service), visual voicemail messages, OCR'ed messages from snapshots of paper mail, and or any other type of messages. The anonymization operation may include removing personally identifiable data and or any other type confidential information from the messages.

At step 204, a language model is used to classify the messages into different categories with corresponding classification scores. In one or more embodiments, the language model may comprise a Sentence-Bidirectional Encoder Representations and Transformers (S-BERT) model. The categories may include, for example:

(1) password change ["there is a need for you to change your password"; "your password has expired, please go to this <link> to change the password"; "your password is about to expire, please go to this <link> to change the password"; "your password has been compromised/hacked, please go to this <link> to change the password"]

(2) fee payment ["you received something, and you need to pay a small amount to receive it"; "you won a lottery, but you will need to pay a processing fee"; "you have a free vacation offer, but you will have to pay a customer fee to access the offer"]

(3) money owed ["you owe us money"; "you have an unpaid invoice"; "you have an unpaid balance on this card/account"; "we are about to send your information to a collections agent"; "please contact us ASAP to make a payment"]

(4) solicitations ["you have a huge financial opportunity ahead"; "you have just qualified for a once-in-a-lifetime opportunity"; "hurry, we have a limited time offer just for you"]

(5) dire need ["I am your relative, I was recently diagnosed with a severe medical condition, and I need financial help immediately"; "i am your friend stranded at this distant airport, and I need you to send me money right away"]

These are just some example categories and should not be considered limiting. In addition, the S-BERT model may generate an "other" category for the messages that may not necessarily fit within the defined categories.

Furthermore, the S-BERT model may generate corresponding confidence scores for each category. A higher confidence score generally indicates a higher probability of selecting a correct category and a lower confidence score generally indicates a lower probability of selecting the correct category. As described below, the confidence scores are used in a training dataset to train the classifier model to determine whether an incoming message is malicious.

At step 206, transaction histories of users are aggregated. In one or more embodiments, the aggregation is for a certain time period, e.g., past 13 months. The transaction histories may be aggregated from different institutions such as banks, other financial institutions, credit card companies, and or the like. The aggregation may include maintaining a table for each user, where the table contains information such as a vendor name (e.g., a payee listed on a credit card statement), total amount paid, last payment amount, last payment date, whether the payments are recurring, and or any other type of transaction data. The transaction data may aid the classifier to determine whether the incoming messages are from known vendors/institutions and conform to the regular pattern of transactions.

At step 208, a training dataset is generated. The training dataset may include, for example, message categories generated by the S-BERT model and their corresponding confidence scores, vendor attributes, message attributes, user attributes, and or any other type of data. Because a supervised approach is used, the training dataset may further include an indication as to whether the message was malicious or non-malicious.

The vendor attributes may include, for example, a type of vendor. For instance, a vendor may provide a monthly subscription model (e.g., a streaming service that renews/has to be renewed every month). This vendor may provide a monthly message indicating to the user that the subscription has been automatically renewed or urging the user to renew the subscription. Another vendor, however, may not provide a monthly subscription model—and monthly messages indicating that a subscription is to be "renewed" are probably malicious.

As another example, a vendor may sell appliances and service those appliances for the customer. This vendor may send periodic messages as a check-in on the status of the appliances and with offers for repairs, if needed. These messages are probably non-malicious. But if a vendor that sells perishable goods (e.g., food items) sends such servicing/repairs-type messages, those messages are probably malicious.

The message attributes may include different content within the message. For example, a message may have a link and or a phone number. The link may have an associated reputation, e.g., whether the link belongs to a reputed, well-known company or an unknown, obscure company. Similarly, the phone number may have an associated reputation, e.g., whether the phone number is of a reputed, well-known company or an unknown, obscure company. If the link and or the phone number are associated with a reputed company, the message may have a lower probability of being malicious and vice-versa. The message attribute may further include a logo included in the message. Similar to the link and the phone number, the logo may also have an associated reputation that may be used to determine the probability of the corresponding message being malicious. Another example of a message attribute may be whether the company that the message originated from issues a statement about a security breach. If there was such a statement about the security breach, the probability of the message being malicious increases.

The user attributes may include any type of user information. The user information may include, for example, financial activity volume. That is, a user with a higher financial activity volume may generally receive a relatively larger number of solicitation messages. In contrast, if a user with a lower financial activity volume receives a large number of solicitation messages, such messages may likely be malicious. Another example of the user attribute may include the age of the user. An elderly user may be more susceptible to be a victim of malicious messages, therefore the maliciousness may be slightly biased for older users compared to younger users. Yet another example of user information may include a city and or any other type of user location. If the messages are from businesses at other far-away cities, the messages may likely be malicious compared to messages originating locally.

At step 210, a classifier model may be trained using the training dataset. In one or more embodiments, the classifier model may include an xgboost classifier. This classifier model, however, is just an example and should not be considered limiting—any kind of machine learning model that may be trained to provide the classification functionality (i.e., malicious vs. non-malicious) should be considered within the scope of this disclosure. In one or more embodiments, the training may include initial training, validation, and subsequent training if a desired level of validation is not achieved. The trained classifier model may then be used for determining whether a new message is malicious or non-malicious.

The deployed classifier model may be periodically retrained based on the accuracy of prediction. For example, a random sample of predicted data may be analyzed by an expert, and such random sample may form retraining data. As the amount of the retraining increases, the classifier model may progressively get more robust.

Figure 3:
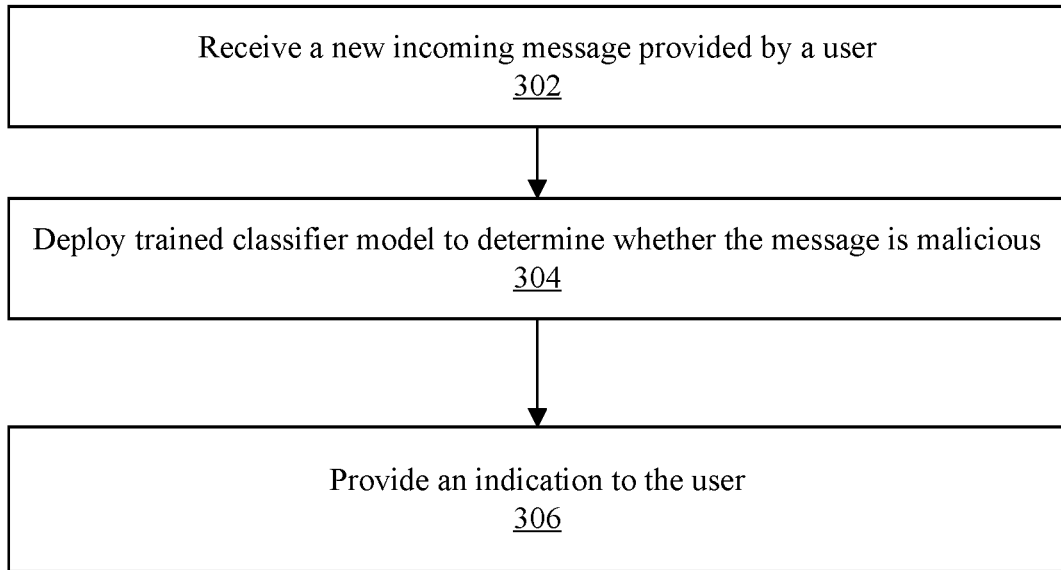
FIG. 3 shows an example method of deploying a trained classifier model for determining whether an incoming message is malicious, based on the principles disclosed herein.

FIG. 3 shows an example method 300 of deploying a trained classifier model for determining whether an incoming message is malicious, based on the principles disclosed herein. One or more steps of the method 300 may be performed by one or more components of the system 100 shown in FIG. 1. It should be understood that the shown steps are merely exemplary and should not be considered limiting. Furthermore, the sequence of the steps is exemplary, and the illustrated sequence should not be considered limiting. Therefore, methods with additional, alternative, fewer, or differently sequenced steps should also be considered within the scope of this disclosure.

The method 300 may begin at step 302, where a user provided new incoming message is received. In an embodiment, the user may forward the new incoming message. In another embodiment, the user may take a snapshot or a screenshot of the message and forward the snapshot/screenshot, which may then be OCRed for text recognition. At step 304, a trained classifier (e.g., trained using the method 300)

may be deployed to determine whether the message is malicious. In addition to the classification of malicious vs. non-malicious, the classifier may further generate a confidence score of the classification. At step 306, an indication is provided to the user as to whether the message has been classified as malicious or non-malicious. For example, the user may be sent an alert message if the message is classified as malicious. In some instances, when the confidence score is low, the user may be asked to contact the source to confirm the authenticity of the message.

Figure 4:
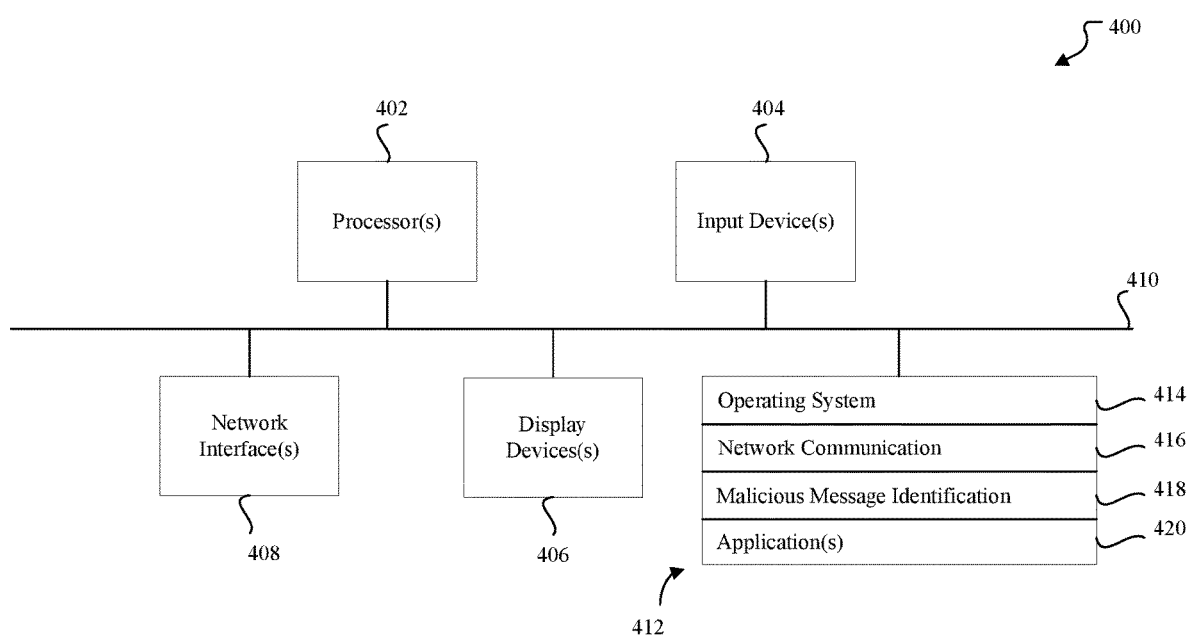
FIG. 4 shows a block diagram of an example computing device that implements various features and processes, based on the principles disclosed herein.

FIG. 4 shows a block diagram of an example computing device 400 that implements various features and processes, based on the principles disclosed herein. For example, computing device 400 may function as first server 120, second server 130, client 150a, client 150b, or a portion or combination thereof in some embodiments. The computing device 400 also performs one or more steps of the methods 200 and 300. The computing device 400 is implemented on any electronic device that runs software applications derived from compiled instructions, including without limitation personal computers, servers, smart phones, media players, electronic tablets, game consoles, email devices, etc. In some implementations, the computing device 400 includes one or more processors 402, one or more input devices 404, one or more display devices 406, one or more network interfaces 408, and one or more computer-readable media 412. Each of these components is coupled by a bus 410.

Display device 406 includes any display technology, including but not limited to display devices using Liquid Crystal Display (LCD) or Light Emitting Diode (LED) technology. Processor(s) 402 uses any processor technology, including but not limited to graphics processors and multi-core processors. Input device 404 includes any known input device technology, including but not limited to a keyboard (including a virtual keyboard), mouse, track ball, and touch-sensitive pad or display. Bus 410 includes any internal or external bus technology, including but not limited to ISA, EISA, PCI, PCI Express, USB, Serial ATA or FireWire. Computer-readable medium 412 includes any non-transitory computer readable medium that provides instructions to processor(s) 402 for execution, including without limitation, non-volatile storage media (e.g., optical disks, magnetic disks, flash drives, etc.), or volatile media (e.g., SDRAM, ROM, etc.).

Computer-readable medium 412 includes various instructions 414 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 404; sending output to display device 406; keeping track of files and directories on computer-readable medium 412; controlling peripheral devices (e.g., disk drives, printers, etc.) which can be controlled directly or through an I/O controller; and managing traffic on bus 410. Network communications instructions 416 establish and maintain network connections (e.g., software for implementing communication protocols, such as TCP/IP, HTTP, Ethernet, telephony, etc.).

Malicious message identification instructions 418 include instructions that implement the disclosed processes for identifying malicious messages.

Application(s) 420 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method performed by a processor, the method comprising:
    classifying a plurality of messages into a plurality of categories, each category associated with a confidence score;
    aggregating transaction histories for a plurality of users that received the plurality of messages;
    training a classifier model on a dataset comprising:
        the plurality of categories and corresponding confidence scores, each confidence score indicating a probability of selecting a correct category,
        vendor attributes in the aggregated transaction histories, and
        message attributes of the plurality of messages;
    receiving a first message from a user; and
    deploying the classifier model and determining, based on the classifier model, whether the first message is a malicious message.

2. The method of claim 1, further comprising:
    transmitting an alert to the user in response to determining that the first message is malicious.

3. The method of claim 1, wherein the first message is in a screenshot form, the method further comprising:
    performing an optical character recognition of the screenshot to extract text of the first message.

4. The method of claim 1, wherein classifying the plurality of messages into the plurality of categories comprises classifying using a Sentence-Bidirectional Encoder Representations from Transformers (S-BERT) model.

5. The method of claim 1, wherein training the classifier model comprises training an xgboost classifier model.

6. The method of claim 1, wherein training the classifier model further comprises:
    training the classifier model on the dataset comprising user attributes of the plurality of users.

7. The method of claim 1, further comprising:
    retraining the classifier model based on accuracy of predictions.

8. The method of claim 1, wherein aggregating the transaction histories further comprises:
    generating a transaction history table for each of the plurality of users.

9. The method of claim 1, wherein aggregating the transaction histories further comprises:
    retrieving transaction data from a plurality of financial institutions.

10. The method of claim 1, wherein determining whether the first message is a malicious message further comprises generating a confidence score associated with the determination.

11. A system comprising:
    a non-transitory storage medium storing computer program instructions; and
    one or more processors configured to execute the computer program instructions to cause operations comprising:
        classifying a plurality of messages into a plurality of categories, each category associated with a confidence score;
        aggregating transaction histories for a plurality of users that received the plurality of messages;
        training a classifier model on a dataset comprising:
            the plurality of categories and corresponding confidence scores, each confidence score indicating a probability of selecting a correct category,
            vendor attributes in the aggregated transaction histories, and
            message attributes of the plurality of messages;
        receiving a first message from a user; and
        deploying the classifier model and determining, based on the classifier model, whether the first message is a malicious message.

12. The system of claim 11, wherein the operations further comprise:
    transmitting an alert to the user in response to determining that the first message is malicious.

13. The system of claim 11, wherein the first message is in a screenshot form, wherein the operations further comprise:
    performing an optical character recognition of the screenshot to extract text of the message.

14. The system of claim 11, wherein classifying the plurality of messages into the plurality of categories comprises classifying using a Sentence-Bidirectional Encoder Representations from Transformers (S-BERT) model.

15. The system of claim 11, wherein training the classifier model comprises training an xgboost classifier model.

16. The system of claim 11, wherein training the classifier model further comprises:

training the classifier model on the dataset comprising user attributes of the plurality of users.

17. The system of claim 11, wherein the operations further comprise:

retraining the classifier model based on accuracy of predictions.

18. The system of claim 11, wherein aggregating the transaction histories further comprises:

generating a transaction history table for each of the plurality of users.

19. The system of claim 11, wherein aggregating the transaction histories further comprises:

retrieving transaction data from a plurality of financial institutions.

20. The system of claim 11, wherein determining whether the first message is a malicious message further comprises generating a confidence score associated with the determination.

\* \* \* \* \*